United States Patent
Ng et al.

(10) Patent No.: US 12,538,238 B2
(45) Date of Patent: Jan. 27, 2026

(54) POWER EFFICIENT RADAR OPERATION FOR MAXIMUM PERMISSIBLE EXPOSURE COMPLIANCE AND UPLINK POWER REDUCTION REPORTING

(71) Applicant: Samsung Electronics Co., Ltd., Suwon-si (KR)

(72) Inventors: Boon Loong Ng, Plano, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 17/804,977

(22) Filed: Jun. 1, 2022

(65) Prior Publication Data

US 2022/0400446 A1 Dec. 15, 2022

Related U.S. Application Data

(60) Provisional application No. 63/209,795, filed on Jun. 11, 2021.

(51) Int. Cl.
*H04W 52/24* (2009.01)
*G01S 7/00* (2006.01)
(Continued)

(52) U.S. Cl.
CPC .......... *H04W 52/241* (2013.01); *G01S 7/006* (2013.01); *G01S 13/003* (2013.01); *H04W 52/42* (2013.01)

(58) Field of Classification Search
CPC ..... H04W 52/241; H04W 52/42; G01S 7/006; G01S 13/003
See application file for complete search history.

(56) References Cited

U.S. PATENT DOCUMENTS

| 6,545,633 B1 * | 4/2003 | Jensen | .................. G01S 13/003 |
| | | | 342/134 |
| 2019/0126889 A1 * | 5/2019 | Oman | ................... B60R 25/243 |

(Continued)

FOREIGN PATENT DOCUMENTS

| CN | 116762425 A | * | 9/2023 | ........... H04B 7/0404 |
| EP | 3122096 A1 | * | 1/2017 | ........... H04B 17/336 |

(Continued)

OTHER PUBLICATIONS

International Search Report and Written Opinion issued Aug. 25, 2022 regarding International Application No. PCT/KR2022/008043, 6 pages.

*Primary Examiner* — Vladimir Magloire

(57) ABSTRACT

A method includes obtaining a set of signal quality measurements. The signal quality measurements correspond to reference signals, respectively, from among a plurality of reference signals received at an electronic device. The method includes determining whether a change in amplitude in the set of signal quality measurements satisfies a temporal condition. The method includes in response to a determination that the change in amplitude in the set of signal quality measurements satisfies the temporal condition, triggering the electronic device to perform radar operations to determine whether a location of an object in proximity to the electronic device satisfies a proximity condition. The method includes in response to a determination that the location of the object satisfies the proximity condition, changing a transmission parameter of uplink wireless signals to satisfy a maximum permissible exposure (MPE) of the object to radio frequency energy.

20 Claims, 11 Drawing Sheets

(51) Int. Cl.
  *G01S 13/00* (2006.01)
  *H04W 52/42* (2009.01)

(56) References Cited

U.S. PATENT DOCUMENTS

| | | |
|---|---|---|
| 2019/0200365 A1 | 6/2019 | Sampath et al. |
| 2019/0261289 A1 | 8/2019 | Raghavan et al. |
| 2020/0112926 A1 | 4/2020 | Laghate et al. |
| 2020/0359330 A1 | 11/2020 | Zacharias et al. |
| 2020/0411960 A1 | 12/2020 | Ng et al. |
| 2021/0055386 A1 | 2/2021 | Rimini et al. |
| 2021/0126719 A1 | 4/2021 | Rimini |
| 2022/0252709 A1* | 8/2022 | Duan .................. G01S 7/006 |

FOREIGN PATENT DOCUMENTS

| | | | | |
|---|---|---|---|---|
| WO | WO-2020256971 A1 * | 12/2020 | ............ | H04W 24/08 |
| WO | 2021045864 A1 | 3/2021 | | |

* cited by examiner

POWER EFFICIENT RADAR OPERATION FOR MAXIMUM PERMISSIBLE EXPOSURE COMPLIANCE AND UPLINK POWER REDUCTION REPORTING

CROSS-REFERENCE TO RELATED APPLICATION AND CLAIM OF PRIORITY

This application claims priority under 35 U.S.C. § 119(e) to U.S. Provisional Patent Application No. 63/209,795 filed on Jun. 11, 2021. The above-identified provisional patent application is hereby incorporated by reference in its entirety.

TECHNICAL FIELD

This disclosure relates generally to wireless communication systems. More specifically, this disclosure relates to power efficient radar operation for maximum permissible exposure compliance and uplink power reduction reporting.

BACKGROUND

A communication system includes a DownLink (DL) that conveys signals from transmission points such as Base Stations (BSs) or gNodeBs to User Equipments (UEs) and an UpLink (UL) that conveys signals from UEs to reception points such as gNodeBs. A UE, also commonly referred to as a terminal or a mobile station, may be stationary or mobile and may be a cellular phone, a personal computer device, etc. A gNodeB, which is generally a fixed station, may also be referred to as an access point or other equivalent terminology.

For mmWave bands, the number of antenna elements can be large for a given form factor. However, the number of digital chains is limited due to hardware constraints (such as the feasibility to install a large number of ADCs/DACs at mmWave frequencies). In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval.

SUMMARY

This disclosure provides methods for power efficient radar operation for maximum permissible exposure compliance and uplink power reduction reporting.

In one embodiment, a method for power efficient radar operation for maximum permissible exposure compliance and uplink power reduction reporting is provided. The method includes obtaining a set of signal quality measurements. The signal quality measurements correspond to reference signals, respectively, from among a plurality of reference signals received at an electronic device. The method includes determining whether a change in amplitude in the set of signal quality measurements satisfies a temporal condition. The method includes in response to a determination that the change in amplitude in the set of signal quality measurements satisfies the temporal condition, triggering the electronic device to perform radar operations to determine whether a location of an object in proximity to the electronic device satisfies a proximity condition. The method includes in response to a determination that the location of the object satisfies the proximity condition, changing a transmission parameter of uplink wireless signals to satisfy a maximum permissible exposure (MPE) of the object to radio frequency energy.

In another embodiment, an electronic device for power efficient radar operation for maximum permissible exposure compliance and uplink power reduction reporting is provided. The electronic device includes a radar circuit configured for the electronic device to operate using radar operations. The electronic device includes a wireless communication circuit configured for the electronic device to operate using a wireless communication protocol different from the radar operations. The electronic device includes a processor configured to obtain a set of signal quality measurements. The signal quality measurements correspond to reference signals, respectively, from among a plurality of reference signals received at an electronic device. The processor is configured to determine whether a change in amplitude in the set of signal quality measurements satisfies a temporal condition. The processor is configured to in response to a determination that the change in amplitude in the set of signal quality measurements satisfies the temporal condition, trigger the electronic device to perform radar operations to determine whether a location of an object in proximity to the electronic device satisfies a proximity condition. The processor is configured to in response to a determination that the location of the object satisfies the proximity condition, change a transmission parameter of uplink wireless signals to satisfy a maximum permissible exposure (MPE) of the object to radio frequency energy.

In yet another embodiment a non-transitory computer readable medium embodying a computer program for power efficient radar operation for maximum permissible exposure compliance and uplink power reduction reporting is provided. The computer program includes computer readable program code that when executed causes at least one processor to obtain a set of signal quality measurements. The signal quality measurements correspond to reference signals, respectively, from among a plurality of reference signals received at an electronic device. The computer readable program code causes the processor to determine whether a change in amplitude in the set of signal quality measurements satisfies a temporal condition. The computer readable program code causes the processor to in response to a determination that the change in amplitude in the set of signal quality measurements satisfies the temporal condition, trigger the electronic device to perform radar operations to determine whether a location of an object in proximity to the electronic device satisfies a proximity condition. The computer readable program code causes the processor to in response to a determination that the location of the object satisfies the proximity condition, change a transmission parameter of uplink wireless signals to satisfy a maximum permissible exposure (MPE) of the object to radio frequency energy.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
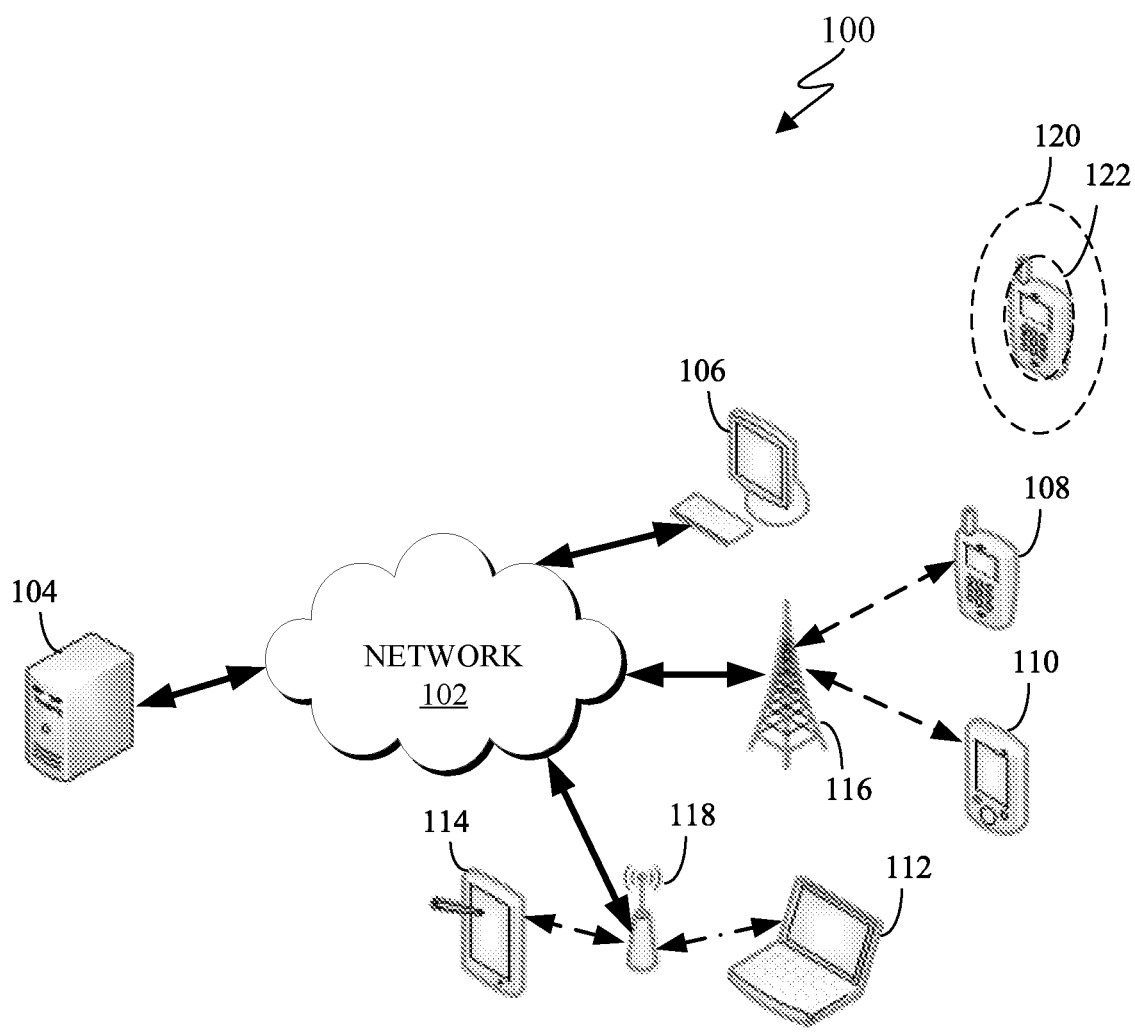
FIG. 1 illustrates an example communication system in accordance with an embodiment of this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Regulators, such as the U.S. Federal Communications Commission (FCC), define RF compliance requirements for radio devices to ensure safety of operations. The RF compliance requirements aim to prevent a human exposure hazard, which is represented by a tissue temperature change. The RF compliance requirement for a frequency above 6 GHz is called the Maximum Permissible Exposure (MPE), which is defined by a Power Density (PD) limit. On Oct. 3, 2018, the FCC issued Interim Guidance in which MPE limit for 28 GHz and 39 GHz is defined as 10 W/m$^2$ in 4 cm$^2$ area with averaging time of 4 seconds. This disclosure provides a technical solution for a radio device to comply with the RF safety requirements by performing actions such as turning off transmission of an antenna module when the risk of RF exposure to human skin may exceed the specified limit.

According to embodiments of this disclosure, a radar assists a wireless communication module to comply with FCC MPE regulations. In order to avoid issues, such as overheating human skin, the WCM performs a safety function referred to as MPE mitigation, such as limiting radiation. By performing the MPE mitigation, the WCM enables a UE to comply with the MPE regulation, which specifies limits of energy transferred to the object (to avoid harming or burning human skin). Embodiments of this disclosure define an MPE condition in which a location of an object (for example, human skin) is close to (e.g., almost touching) the antenna module, and in response to satisfaction of the defined MPE condition, the WCM performs the MPE mitigation including backing off intensity by reducing maximum power, reducing duty cycle, or average power over a specified period of time. As a technical solution, the radar detects an object located close to the antenna module, and in response to the detection, then trigger WCM to execute MPE mitigation or otherwise inform WCM that it is time to apply MPE mitigation.

According to embodiments of this disclosure, the WCM assists the radar to decide when to switch to an ON state in which the radar performs object detection, and when to switch to an OFF state in which the radar does not perform object detection. The radar consumes power if always in the ON state trying to detect an object. For example, this disclosure sets forth a "Lying-on-the-Table Scenario," namely, a scenario in which a UE is lying on a table and resting for while during which period of time no object (e.g., hand and/or body of a person) blocks signals transmitted and/or received between the UE and the base station enough to satisfy a hand/body blockage condition. The hand/body blockage condition might not be satisfied if an object is not located near the UE, or if the object is not located along a path of the signals between the UE and the base station. The hand/body blockage condition is satisfied when the signals, which are transmitted and/or received between the UE and the base station, are blocked by an object that is located near the UE, and the blockage measurably diminishes the strength and/or quality of the signals received at the UE. If the radar is always performing object detection during the Lying-on-the-Table Scenario, then radar wastes energy because it is wasteful to continuously perform object detection while a person is not close to the antenna module. To avoid wasting energy, as one technical solution, this disclosure configures the radar to be in the OFF state when the hand/body blockage condition is not satisfied. As another technical solution for avoiding energy waste, this disclosure configures the WCM to determine if a channel change happening, which may indicate that an object (e.g., person) has moved into a location between the UE and the base station and has caused blockage of signals transmitted and/or received between the UE and the base station. If the channel change is happening, then the WCM determines whether to prepare the radar to perform object detection, and in particular, the WCM determine whether to trigger the radar to switch from the OFF state to the ON state.

According to embodiments of this disclosure, if the UE is performing MPE mitigation (e.g., power rejection), then UE generates an MPE Power Management Maximum Power Reduction (P-MPR) report and transmits the MPE P-MPR report to the base station. By receiving the MPE P-MPR report from the UE, the base station (or network) is enabled to identify compliance with radio frequency (RF) regulations or MPE regulations as a reason that the UE is performing uplink power reduction. According to embodiments of this disclosure, a radar helps assists the UE to decide when to generate and when to transmit the MPE P-MPR report.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver. In certain embodiments, the client devices 106-114 are able to sense the presence of an object located close to the client device and determine whether the location of the detected object is within a first area 120 or a second area 122 closer to the client device than a remainder of the first area 120 that is external to the first area 120. In certain embodiments, the boundary of the second area 122 is at a close proximity that is almost touching the client device, and the first area 120 can be a within a close range (e.g., 1 meter away, or 2 meters away) from the client device.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
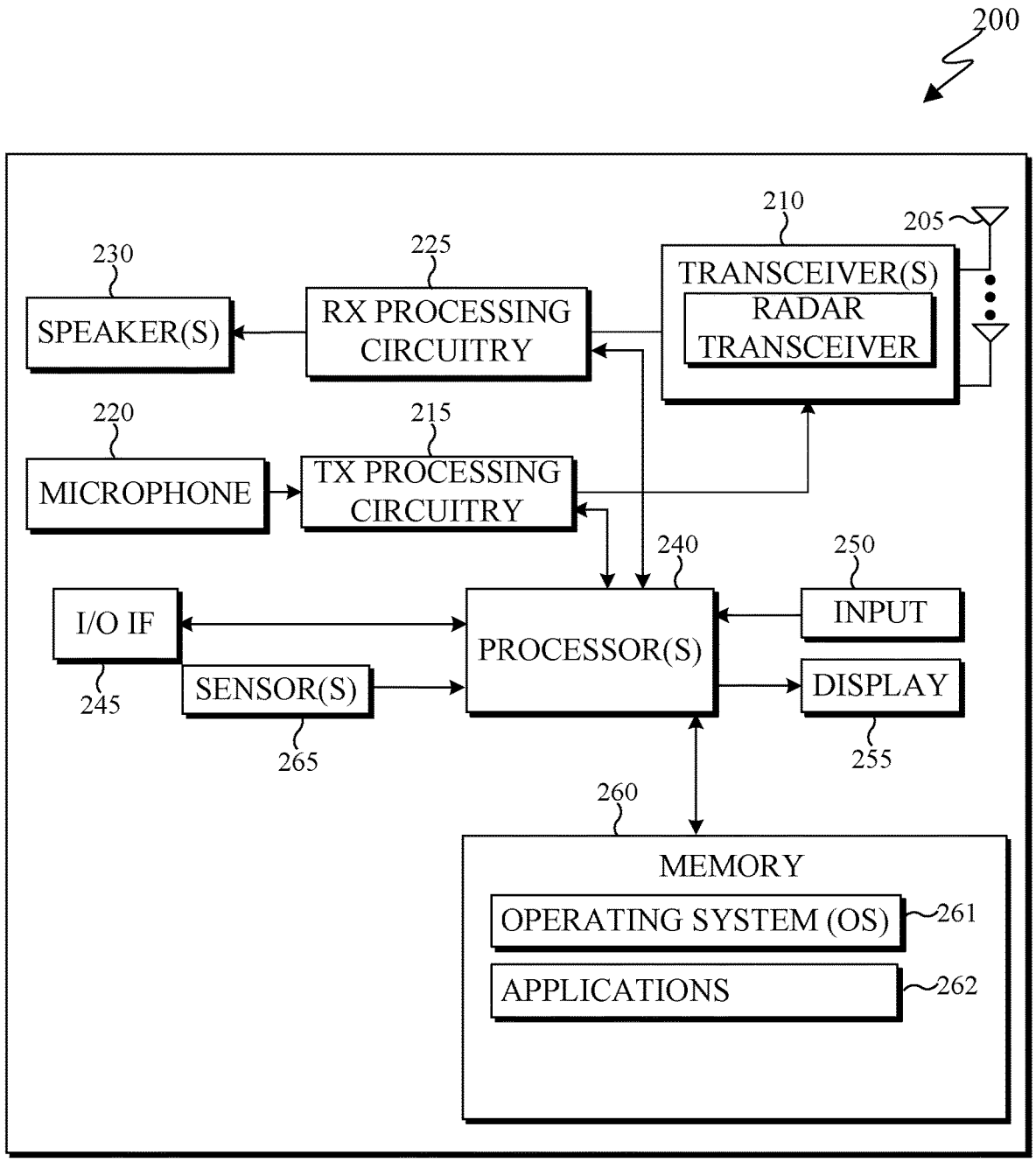
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

Figures 3, 4, 5, 6:
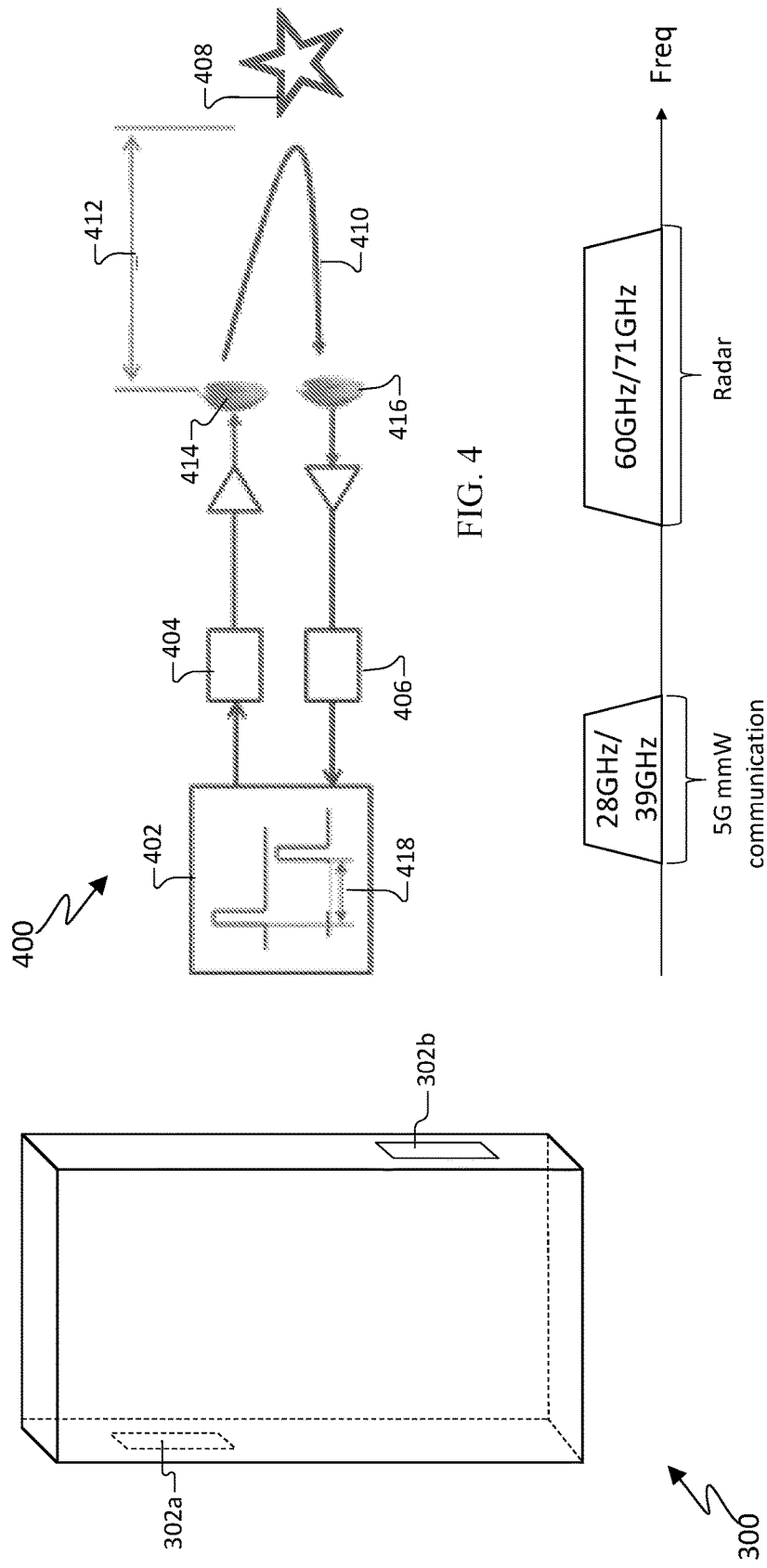
FIG. 3 illustrates a three-dimensional view of an example electronic device that includes multiple millimeter wave (mmWave) antenna modules in accordance with an embodiment of this disclosure.
FIG. 4 illustrates an example architecture of a monostatic radar in an electronic device 400 in accordance with an embodiment of this disclosure.
FIG. 5 illustrates frequency spectra for operating 5G communication at different frequency bands than radar operates in accordance with an embodiment of this disclosure.
FIG. 6 illustrates frequency spectra for 5G communication operations and radar operations sharing the same frequency bands in accordance with an embodiment of this disclosure.

In certain embodiments, the radar transceiver 270 is a monostatic radar. In A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter of can transmit millimeter wave (mmWave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302*a* and the second antenna module 302*b* are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving.

FIG. 5 illustrates frequency spectra for operating 5G communication at different frequency bands than radar operates in accordance with an embodiment of this disclosure. The example shown in FIG. 5 is one possible frequency operation framework of mmWave communication and radar operation, namely with non-overlapping frequency.

FIG. 6 illustrates frequency spectra for 5G communication operations and radar operations sharing the same frequency bands in accordance with an embodiment of this disclosure. The example shown in FIG. 6 is one possible frequency operation framework of mmWave communication and radar operation, namely with overlapping frequency. The overlapping frequency can be for a particular band such as the 60 GHz/71 GHz band.

Although FIG. 5 and FIG. 6 illustrate two examples of frequency spectra for 5G communication operations and radar operations, various changes may be made to FIG. 5 and FIG. 6. As a particular example, in another possible frequency operation framework, radar operating at the 24 GHz band can interfere with 5G communication at 28 GHz band.

Figures 7, 8:
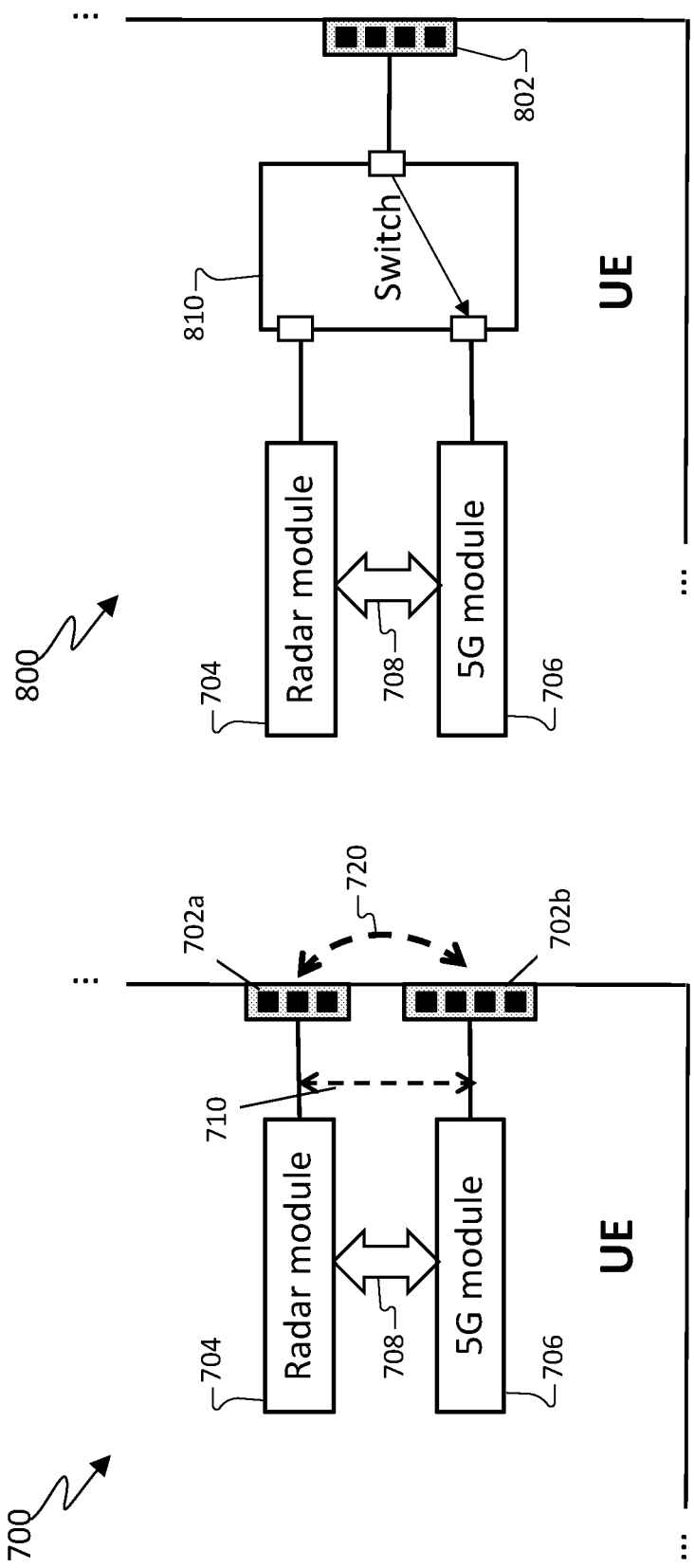
FIG. 7 illustrates an example electronic device that includes an antenna panel for radar operations and a separate antenna panel for 5G communication operations in accordance with an embodiment of this disclosure.
FIG. 8 illustrates an example electronic device that includes a common antenna panel for radar operations and 5G communication operations in accordance with an embodiment of this disclosure.

FIG. 7 illustrates an example electronic device 700 that includes an antenna panel 702a for radar operations and a separate antenna panel 702b for 5G communication operations in accordance with an embodiment of this disclosure.

The architecture of the electronic device 700 includes a radar system (also simply referred to as "radar") that comprises a radar module 704 and the antenna panel 702a. The architecture of the electronic device 700 further includes a wireless communication system that comprises a wireless communication module 706 (for example, a 5G communication module) and the antenna panel 702b. Internally, within the electronic device 700, a control interface 708 connects the radar module 704 to the wireless communication module 706 to enable the two systems to communicate control signals to each other. The antenna panels 702a-702b can be similar to the antenna modules 302 of FIG. 3, or the transmit and receive antennas 414 and 416 of the monostatic radar of FIG. 4. Each of the antenna panels 702a-702b includes multiple antenna elements.

The architecture of the electronic device 700 may suffer from an inter-system interference problem due to a lack of RF isolation between the two systems. As an example, inter-system interference 710 may occur between the internal circuits associated with the radar module 704 and the internal circuits associated with the wireless communication module 706. As another example, RF interference over-the-air 720 may occur inter-system, between the wireless communication system and the radar system.

Independent communication operations and radar operations by an electronic device 700 may not be possible when the radio frequency (RF) isolation between the wireless communication and radar systems is not sufficient. The radar transmission interference to the 5G signal reception can depend on the radar Tx power, the radar bandwidth, the radar Tx power spectral density, and the 5G system bandwidth which is interfered by the radar transmission. For directional radar and/or directional 5G beams, the radar interference level to the 5G DL reception can also be a function of the operating beams. Under this condition of directional beams, simultaneous communication reception and radar transmission (or simultaneous communication transmission and radar reception) may not be feasible due to the interference between the two systems.

In the embodiment shown in FIG. 7, the electronic device 700 includes multiple processors (such as the processor(s) 240 of FIG. 2) comprising the radar module 704 and wireless communication module 706, respectively. This disclosure is not limited to the radar module 704 and the wireless communication module 706 being two discrete hardware components. In other embodiments, the radar module 704 and wireless communication module 706 may be software modules that are stored in memory (such as the memory 260 of FIG. 2) and executed by one or more processors in the electronic device 700. However, for simplicity, the radar module 704 will be described as the radar, which detects the range, velocity and/or angle of a target object (such as the target object 408 of FIG. 4) and which is used for proximity sensing, gesture recognition, liveness detection, mmWave blockage detection, and so on.

The wireless communication module 706 enables the electronic device 700 to perform wireless communication with the network (such as the network 102 of FIG. 1). For example, the wireless communication module 706 enables the electronic device 700 to establish a connection with a base station (for example, base station 116).

A base station 116 could utilize one or multiple transmit beams to cover the whole area of one cell. The base station 116 may form a transmit beam by applying suitable gains and phase settings to an antenna array of the base station. In order to overcome higher propagation losses at higher frequencies such as the mmWave frequency, the base station 116 may form multiple transmit beams, each transmit beam providing coverage over a region narrower than the whole coverage region of the one cell. The wireless communication module 706 may also form receive beams to increase the signal-to-interference-and-noise ratio (SINR) at the receiver within the electronic device 700. Analogously, in the uplink scenario, the wireless communication module 706 may form transmit beams, and the base station 116 may form receive beams.

The electronic device 700, using wireless communication module 706, and the base station 116 implement a beam sweeping procedure to assist the electronic device 700 in determining or selecting the electronic device's receive beam and/or transmit beam. The beam sweeping procedure includes the base station 116 transmitting a set of transmit beams to sweep the cell area, and the electronic device 700 measuring the signal quality on different beams using electronic device's downlink receive beams. To facilitate candidate beam identification, beam measurement, and beam quality reporting, the base station 116 configures the electronic device 700 with one or more reference signal (RS) resource corresponding to a set of downlink TX beams. Examples of an RS resource include an SSB, channel state information RS (CSI-RS) resource, and/or CSI-RS resource indicator (CRI). The CSI-RS resources can be periodic, aperiodic, or semi-persistent. An RS resource refers to a reference signal transmission on a combination of one or more time/frequency/spatial domain locations. As an example, the time domain, frequency domain, and spatial domain can be represented as an Orthogonal Frequency Division Modulation (OFDM) symbol, resource element, and antenna port, respectively. For each DL receive beam, the electronic device 700 reports different DL transmit beams received using that DL receive beam, ranked in order of signal strength (RSRP) and optionally CSI. Examples of CSI include Channel Quality Indicator (CQI), Precoding Matrix Indicator (PMI), or rank indicator (RI). Based on the measurement report feedback received from the electronic device 700, the base station 116 indicates to the electronic device 700 with one or more Transmission Configuration Indicator (TCI) states for reception of Physical Downlink Control Channel (PDCCH) and/or Physical Downlink Shared Channel (PDSCH).

To compensate for the narrower analog beamwidth in mmWave, electronic device 700 can employ analog beam sweeping to enable wider signal reception or transmission coverage for the electronic device 700. A beam codebook includes a set of codewords, where a codeword is a set of analog phase shift values, or a set of amplitude plus phase shift values, applied to the antenna elements, in order to form an analog beam.

The electronic device 700, using the wireless communication module 706, implements a beam management procedure to maintain the selected antenna module as well as the corresponding selected beam of the antenna module for signal reception and transmission by the electronic device 700. The electronic device 700 can use multiple antenna panels 702a-702b simultaneously, in which case the beam management procedure can select a beam of each antenna panel 702a and 702b for signal reception and transmission by the electronic device 700.

FIG. 8 illustrates an example electronic device 800 that includes a common antenna panel 802 for radar operations and 5G communication operations in accordance with an embodiment of this disclosure. The electronic device 800 further includes a radar module 704, wireless communication module 706, and control interface 708, which may be the same as or similar to corresponding components in FIG. 7. The electronic device 800 includes a switch 810 that connects the antenna panel 802 to the wireless communication module 706 for wireless communication operations, and that switches to alternatively connect the antenna panel 802 to the radar module 704 for radar operations. The antenna panel 802 can be similar to the antenna module 302 of FIG. 3 and includes multiple antenna elements. As described above, due to a lack of RF isolation between the two systems, inter-system interference may occur in the switch 810 due to imperfect isolation.

Although FIG. 7 and FIG. 8 illustrate two examples of an electronic device that includes a radar module and a wireless communication module, various changes may be made to FIG. 7 and FIG. 8. As a particular example, the wireless communication module 706 and the radar module 704 can be manufactured by the same manufacturer or by different manufacturers the control interface 708 provides.

Figure 9:
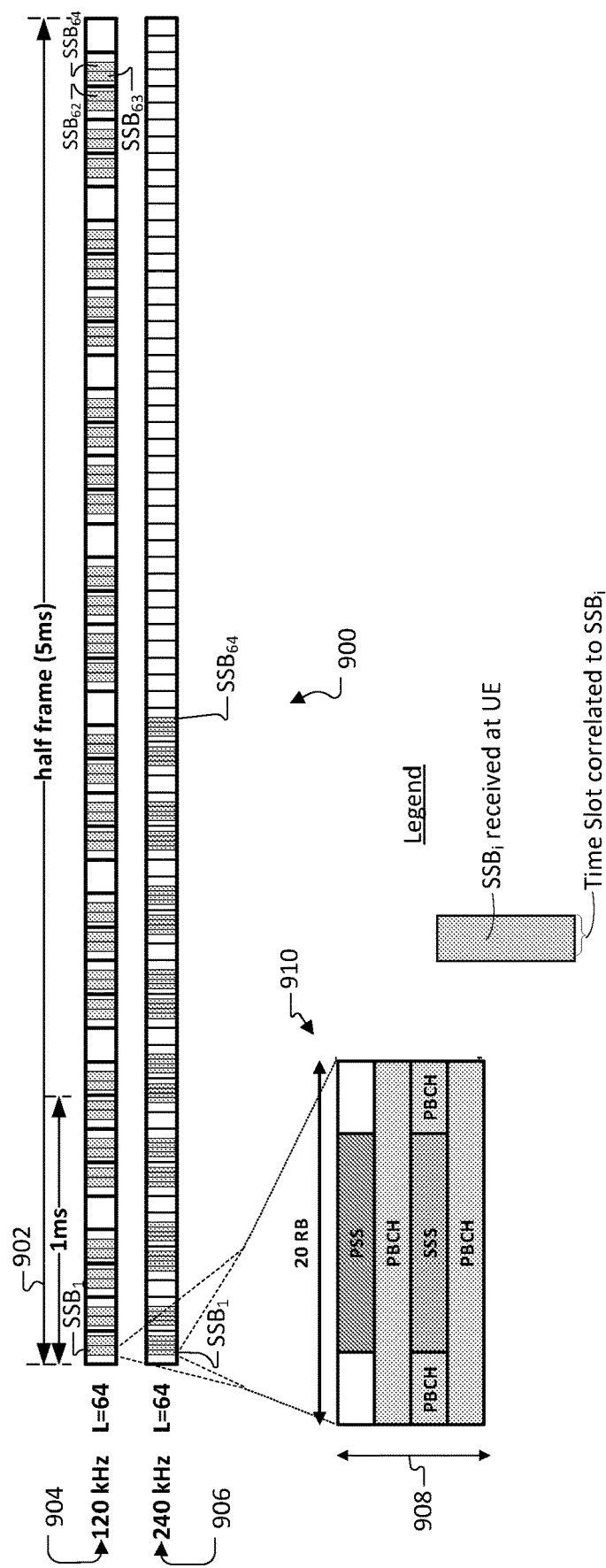
FIG. 9 illustrates a time-domain mapping of Synchronization Signal Block (SSB) time slots in a half frame in accordance with an embodiment of this disclosure.

FIG. 9 illustrates a time-domain mapping 900 of Synchronization Signal Block (SSB) time slots in a half frame in accordance with an embodiment of this disclosure. The embodiment of the time-domain mapping 900 shown in FIG. 9 is for illustration only, and other embodiments could be used without departing from the scope of this disclosure.

As a particular example, the half frame 902 is 5 milliseconds in time-domain mapping 900. A half frame includes a number L of SSBs, herein referred to as a burst of SSBs. The half frame 902 includes SSB time slots 904 and 906 for up to 64 SSBs for SSB subcarrier spacing (SCS) of 120 kHz and 240 kHz, respectively. In certain embodiments, the SSB time-domain mapping is periodic with a 20 ms interval by default, but other periodicities such as 40 ms and 80 ms are also possible depending on network configuration. The SSB duration 908, for a single SSB 910, is about 17.85 microseconds (µs) and 35.66 µs for SSB SCS of 240 kHz and 120 kHz, respectively. Similarly, a half frame 902 can include about twice as many SSB time slots 906 for SSB SCS of 240 kHz, compared to the number of SSB time slots 904 for SSB SCS of 120 kHz. The frequency domain of the SSB 910 can include twenty resource blocks. As an example, the SSB 910 can include a sequence of a Primary Synchronization Signal (PSS), physical broadcast channel (PBCH), secondary synchronization signal (SSS) concurrent with two PBCH, and PBCH. Each SSB 910 can be identified by an SSB index (i).

For example, the SSB index i=1 and i=64 can identify a first SSB (shown as $SSB_1$) and a last SSB (shown as $SSB_{64}$) of the half frame.

As introduced above, the base station 116 configures the electronic device 200 with RS resources, such as SSBs 910, by transmitting a set of reference signals via a corresponding set of DL transmit beams to sweep the cell area. The electronic device 200 receives the set of reference signals as a burst of SSBs. As a particular example, all of the SSBs 910 within a half frame 902 can be a burst of SSBs (such as $\{SSB_1, SSB_i, \ldots, SSB_{64}\}$). As shown in the legend of FIG. 9, the time slot during which a particular SSB (for example, $SSB_i$) is received at the electronic device 200 is correlated to that particular SSB. In certain scenarios, the electronic device 200 receives consecutive SSBs that are contiguous SSBs, such as $SSB_{63}$ and $SSB_{64}$, but other consecutive SSBs can be non-contiguous, such as $SSB_{62}$ and $SSB_{63}$. The electronic device 200 implements a beam management procedure, in which to select a beam for the electronic device 200 to connect to the network via a base station, the electronic device 200 measures one or more RS resource corresponding to a set of base station transmit (TX) beams. The electronic device 200 can be configured to measure the SSB 910 to generate measurement quantities such as SS reference signal received power (SS-RSRP), SS reference signal received quality (SS-RSRQ), or SS signal-to-interference and noise ratio (SS-SINR). The measurement quantities generated from an SSB quantify signal quality of the SSB. The electronic device 200 can measure SS-RSRP for Layer 3 (L3) reporting, and also for Layer 1 (L1) reference signal received power (L1-RSRP). The electronic device 200 measures SS-RSRP among the reference signals corresponding to SSBs with the same SSB index and the same physical-layer cell identity (PCI). The electronic device 200 can select a DL TX beam and/or DL RX beam that satisfy beam selection criteria. In certain embodiments, the reporting range of SS-RSRP for L3 reporting is defined from −156 dBm to −31 dBm with 1 dB resolution. In certain embodiments, the reporting range of SS-RSRP and CSI-RSRP for L1 reporting is defined from −140 to −40 dBm with 1 dB resolution.

Figure 10:
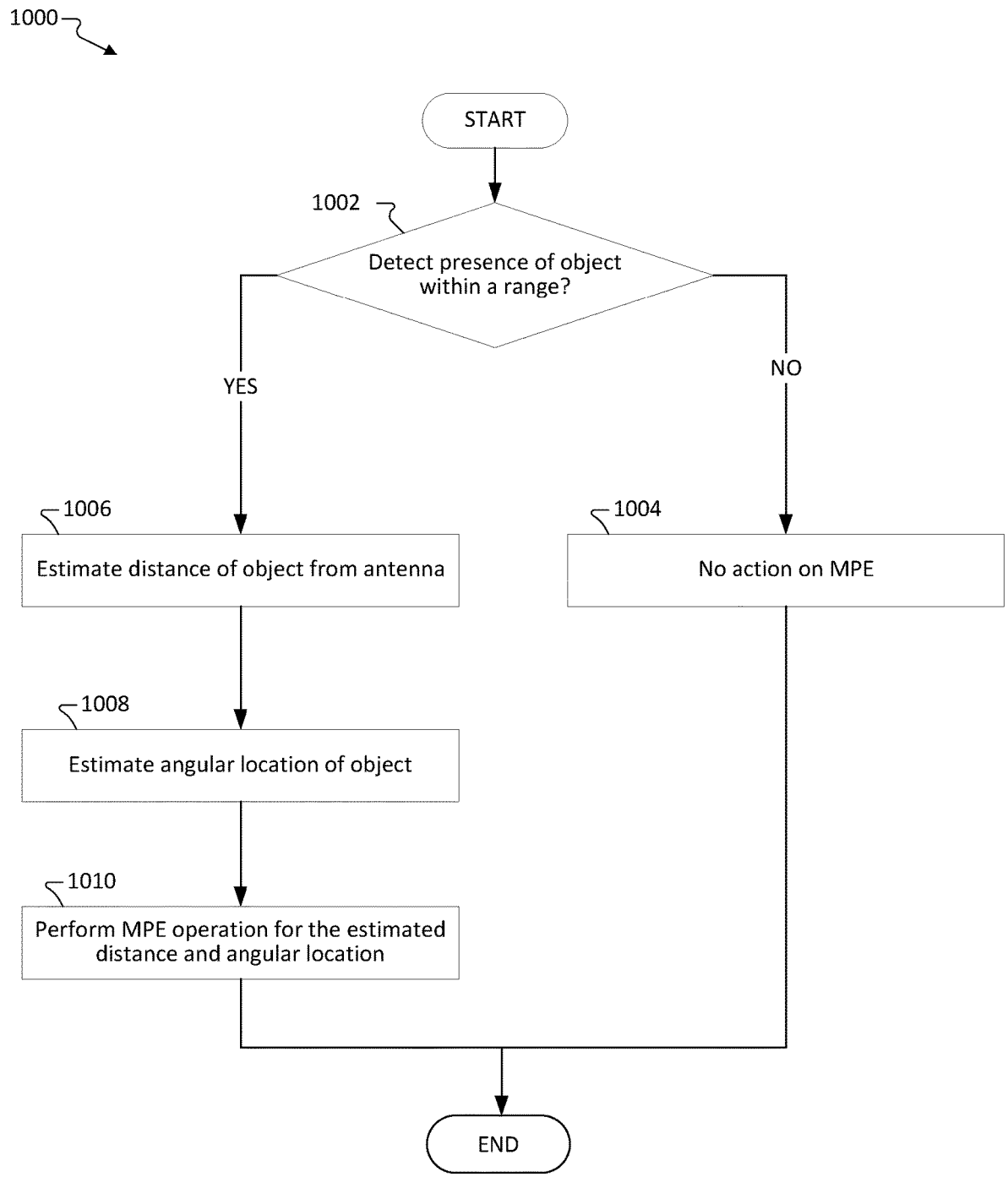
FIG. 10 illustrates an object distance and angular dependent MPE compliance process performed by the radar within a client device in accordance with an embodiment of this disclosure.

FIG. 10 illustrates an object distance and angular dependent MPE compliance process 1000 performed by the radar within a client device in accordance with an embodiment of this disclosure. The embodiment of the process 1000 illustrated in FIG. 10 is for illustration only and other embodiments can be used without departing from the scope of the present disclosure. The process 1000 can be implemented by one or more of the client devices 106-114 or by an electronic device 200, 300, 400, 700, 800, that includes a radar, such as the radar that includes the radar module 704 and the antenna panel 702a in FIG. 7. More particularly, the process 1000 could be and is described as being performed by a processor 240 of the electronic device 200 of FIG. 2.

At the start of the process 1000, the radar of the electronic device 200 is in or switched to an ON state. At block 1002, the processor 240 determines whether a presence of an object is detected within a range. More particularly, to assist the wireless communication module (WCM) 706 to comply with FCC maximum permissible exposure (MPE) regulations, the radar module 704 detects presence of an object within a range of close proximity (e.g., within the second area 122) relative to the antenna module, and in response to the detection of the presence of the object within the range of close proximity, triggers the WCM 706 to execute MPE mitigation. At block 1004, in response to not detecting the presence of the object within the range, the processor 240 takes no action. For example, the radar module 704 does not perform any action MPE mitigation operation related to MPE compliance. At block 1006, in response to detecting the presence of the object within the range, the processor 240 estimates a distance of the object relative to a reference location, such as a distance of the object from the antenna module 702a-702b. At block 1008, the processor 240 estimates an angular location of the object relative to the reference location (e.g., antenna module 702a-702b). More particularly, the angular location of the object can be an azimuth and/or an elevation.

At block 1010, the processor 240 performs an MPE operation for the estimated distance and estimated angular location. More particularly, the radar module 704 triggers the WCM 706 to execute MPE mitigation corresponding to the estimated distance and angular location of the object. To trigger the WCM 706, the radar module 704 can send a control signal to the WCM 706 or can output a value using one or more pins that are accessible to the WCM 706, for example, general purpose input/output (GPIO) pins. Examples of an MPE mitigation operation that the WCM 706 can execute include: limiting radiation; limiting energy transferred to the object; backing off intensity by reducing maximum power; reducing duty cycle; or reducing average power over a specified period of time.

Figure 11:
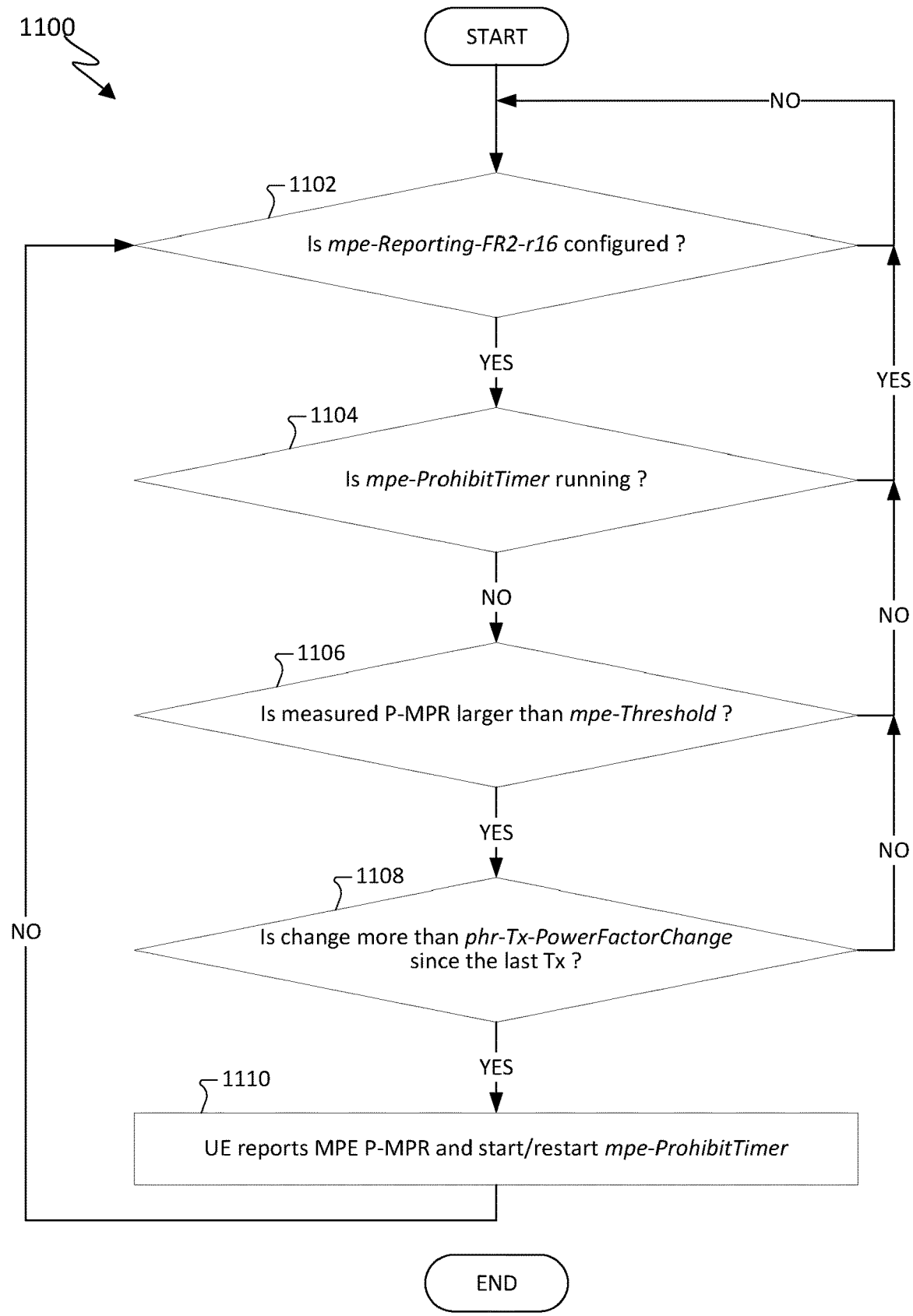
FIG. 11 illustrates a MPE P-MPR reporting process performed by a client device in accordance with an embodiment of this disclosure.

FIG. 11 illustrates a MPE P-MPR reporting process 1100 performed by a client device in accordance with an embodiment of this disclosure. The embodiment of the process 1100 illustrated in FIG. 11 is for illustration only and other embodiments can be used without departing from the scope of the present disclosure. In the 3GPP 5G NR Rel-16 specification, to allow the network to detect UL power reduction by the UE due to complying with RF compliance requirements, the UE can generate a Power Headroom report (PHR). An overview of the UE MPE P-MPR reporting procedure is shown in FIG. 11 as the process 1100. The process 1100 can be implemented by one or more of the client devices 106-114 or by an electronic device 200, 300, 400, 700, 800 that includes a WCM 706 and includes a radar, such as the radar that includes the radar module 704 and the antenna panel 702a in FIG. 7. More particularly, the process 1100 could be and is described as being performed by a processor 240 of the electronic device 200 of FIG. 2.

The process 1100 starts at block 1102, at which the processor 240 determines whether mpe-Reporting-FR2-r16 is configured at the electronic device 200. In response to a determination that mpe-Reporting-FR2-r16 is not configured, the process 1100 starts over, returning to block 1102. At block 1104, in response to a determination that mpe-Reporting-FR2-r16 is configured, the processor 240 determines whether mpe-ProhibitTimer is running. For example, the processor 240 determines mpe-ProhibitTimer is running if a time period defined by the mpe-ProhibitTimer has not yet elapsed since the last start/restart. In response to a determination that mpe-ProhibitTimer is running, the process 1100 starts over, returning to block 1102. At block 1106, in response to a determination that mpe-ProhibitTimer is not running, the processor 240 compares a measured P-MPR to an rive-Threshold and determines whether a result of the comparison satisfies a specified condition (e.g., reporting/report-updating condition), where the specified condition is defined at least in part by the we-Threshold. In certain embodiments, the processor 240 determines the specified condition is satisfied when a measured P-MPR is larger than we-Threshold. In response to a determination the result of the comparison does not satisfy the specified condition (e.g., the measured P-MPR is not larger than we-Threshold), the process 1100 starts over, returning to block 1102. In response to a determination the measured P-MPR is larger than we-Threshold, the process 1100 proceeds to block 1108. At block 1108, the processor 240 determines whether a change that is greater than phr-Tx-PowerFactorChange has occurred since the last transmission (e.g., most recent transmission from the electronic device 200). If the change is not greater than phr-Tx-PowerFactorChange, the process 1100 starts over, returning to block 1102. At block 1110, in response to a determination the change since the last transmission is greater than phr-Tx-PowerFactorChange, the processor 240 generates a Power Headroom report (PHR), transmits the PHR to the gNB 116, and starts/restarts the mpe-ProhibitTimer. The PHR may contain P-MPR information that the electronic device 200 uses to comply with the MPE regulation for frequency range 2 (FR2). The FR2 is set for limiting RF exposure on human body. The processor 240 transmits the PHR using MAC signaling. After block 1110, the process 1100 starts over, returning to block 1102.

Figure 12:
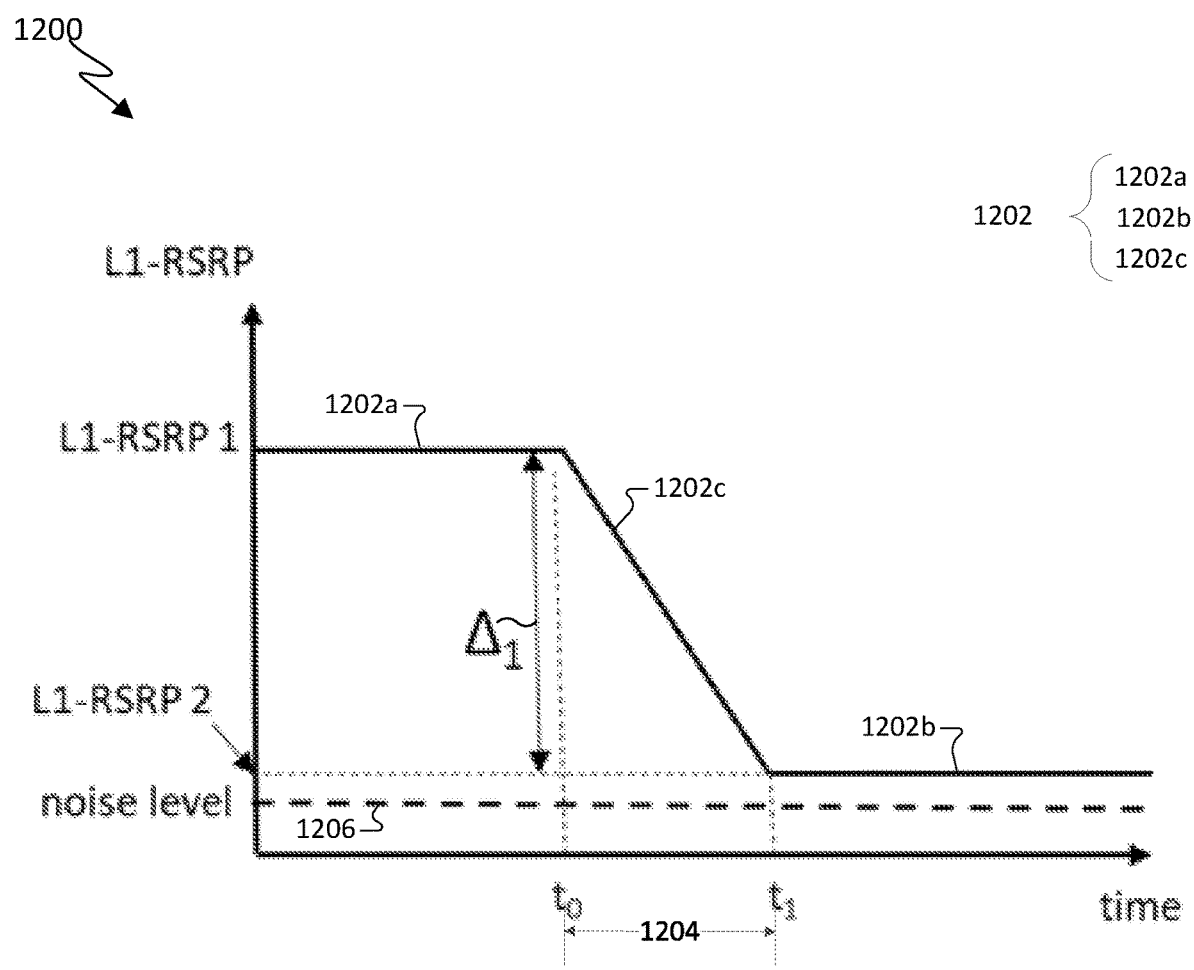
FIG. 12 illustrates a timeline showing a drop of measured strength and/or quality of L1-RSRP due a blockage of signals transmitted and/or received between a UE and the base station in accordance with an embodiment of this disclosure.

FIG. 12 illustrates a timeline 1200 showing a drop of measured strength and/or quality of L1-RSRP 1202 due a blockage of signals transmitted and/or received between a UE and the base station in accordance with an embodiment of this disclosure. The embodiment of the measured strength and/or quality of L1-RSRP 1202 shown in timeline 1200 in FIG. 12 is for illustration only, and other embodiments could be used without departing from the scope of this disclosure.

The timeline 1200 shows an output from the WCM 706 sensing if there is a channel change happening so that the radar can prepare to turn on. More particularly, the WCM 706 senses one or more beam measurement metrics, such as L1-RSRP, which measurement represents a channel condition between a UE (e.g., electronic device 700) and base station. Even during the Lying-on-the-Table scenario, the WCM 706 performs wireless communications with the base station, and concurrently monitors and measures signals between the electronic device 700 and the base station. If there is a change happening in the surroundings of the electronic device 700, such as a human is starting to approach the electronic device 700 such that the human is located in an area of interest (e.g., located within the first area 120) that is close enough to the electronic device 700 to cause a change in the channel condition (e.g., a high level of RSRP drops to a lower level), then the WCM 706 detects a change in the channel condition. The WCM 706 can detect changing of the measured strength and/or quality of L1-RSRP 1202 as evidence of the channel condition change even if the location of the human is not yet close enough to the electronic device 700 to satisfy an MPE condition (i.e., not almost touching the electronic device; or located within the remainder of the first area 120 that is external to the second area 122). The WCM 706 determines whether a hand/body blockage condition is satisfied based on the detected change in the channel condition.

In response to a determination that the hand/body blockage condition is not satisfied, the WCM 706 keeps the radar in the OFF state by not triggering the radar module 704 to switch states. In response to a determination that the hand/body blockage condition is satisfied, the WCM 706 triggers the radar module 704 to switch to the ON state, which prepares the electronic device to monitor for and/or to confirm an event satisfying an MPE condition. For example, when the radar module 704 has switched to the ON state, performance of object detection operations enable the radar to determine whether the object (e.g., human), which moved to a location within a first area 120 close enough to the electronic device 700 to cause the hand/body blockage condition to be satisfied, is at a location within a second area 122 close enough to the antenna panel 702 such that the location of the object satisfies an MPE condition. The second area 122 is smaller than and included within the first area 120 and is closer to the antenna panel 702 than a remainder of the first area 120 external to the second area 122. The remainder of the first area 120 that is external to the second area 122 is far enough away from the antenna panel 702 to not trigger the radar module 704 to switch to the ON state and to not to trigger the WCM 706 to perform MPE mitigation.

In certain embodiments, the hand/body blockage condition is satisfied when the beam measurement metric (e.g., measured strength and/or quality of L1-RSRP 1202) changes by an amount that is greater than or equal to a threshold amplitude change $\Delta_1$ and within a period of time that is shorter than or equal to a specified length of time 1204 ($t_0$ to $t_1$). The threshold amplitude change $\Delta_1$ can defined by a difference between a first level of beam measurement metric 1202a (e.g., L1-RSRP 1) and a second level of beam measurement metric 1202b (e.g., L1-RSRP 2) that is less than the first level of beam measurement metric 1202a. The changing 1202c of the measured strength and/or quality of L1-RSRP 1202 commences prior to satisfaction of the hand/body blockage condition. In certain embodiments, the second level of beam measurement metric 1202b is greater than a noise level 1206.

Figure 13A:
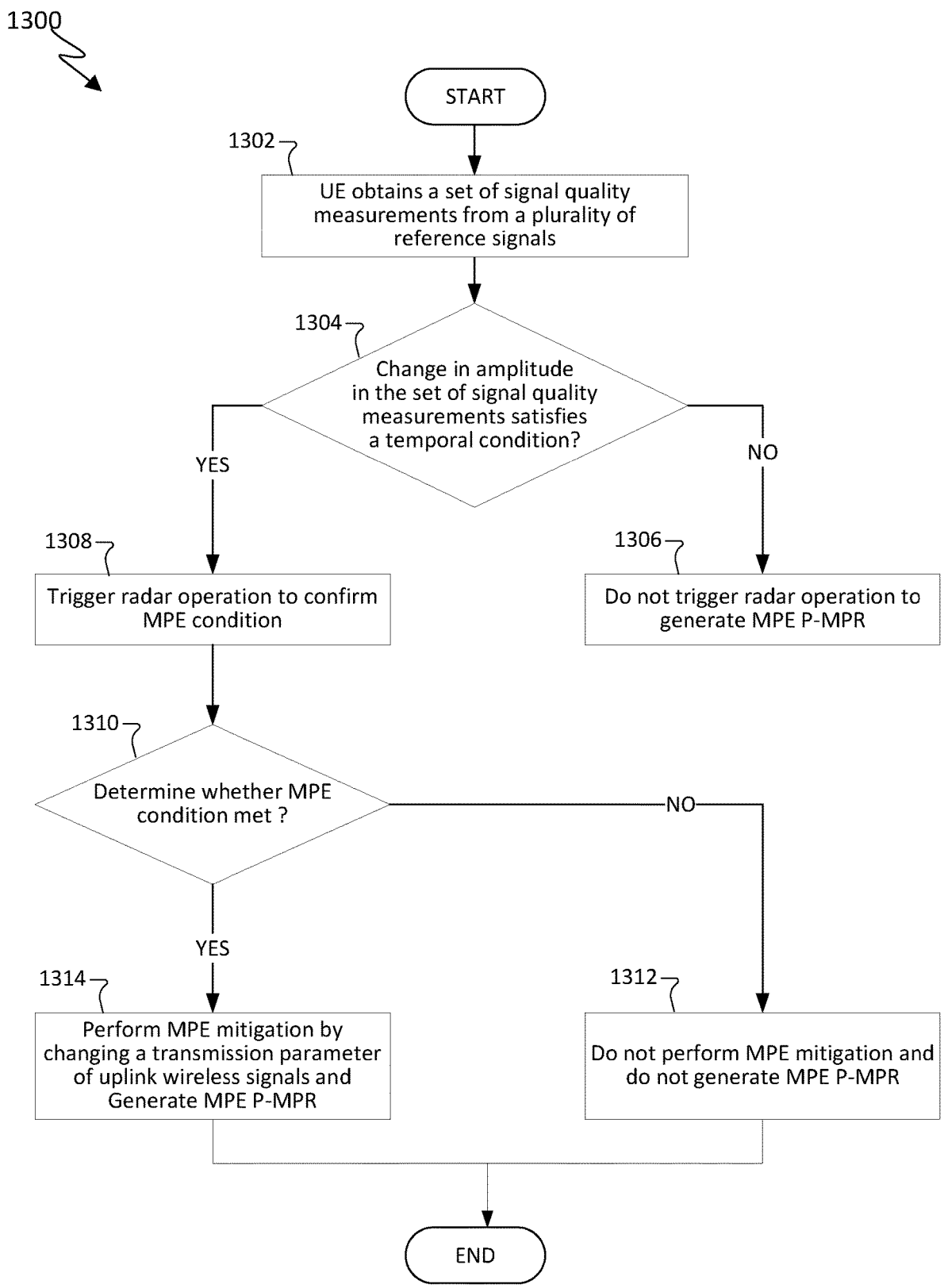
FIG. 13A illustrates a radar activation method in accordance with an embodiment of this disclosure.
Figure 13B:
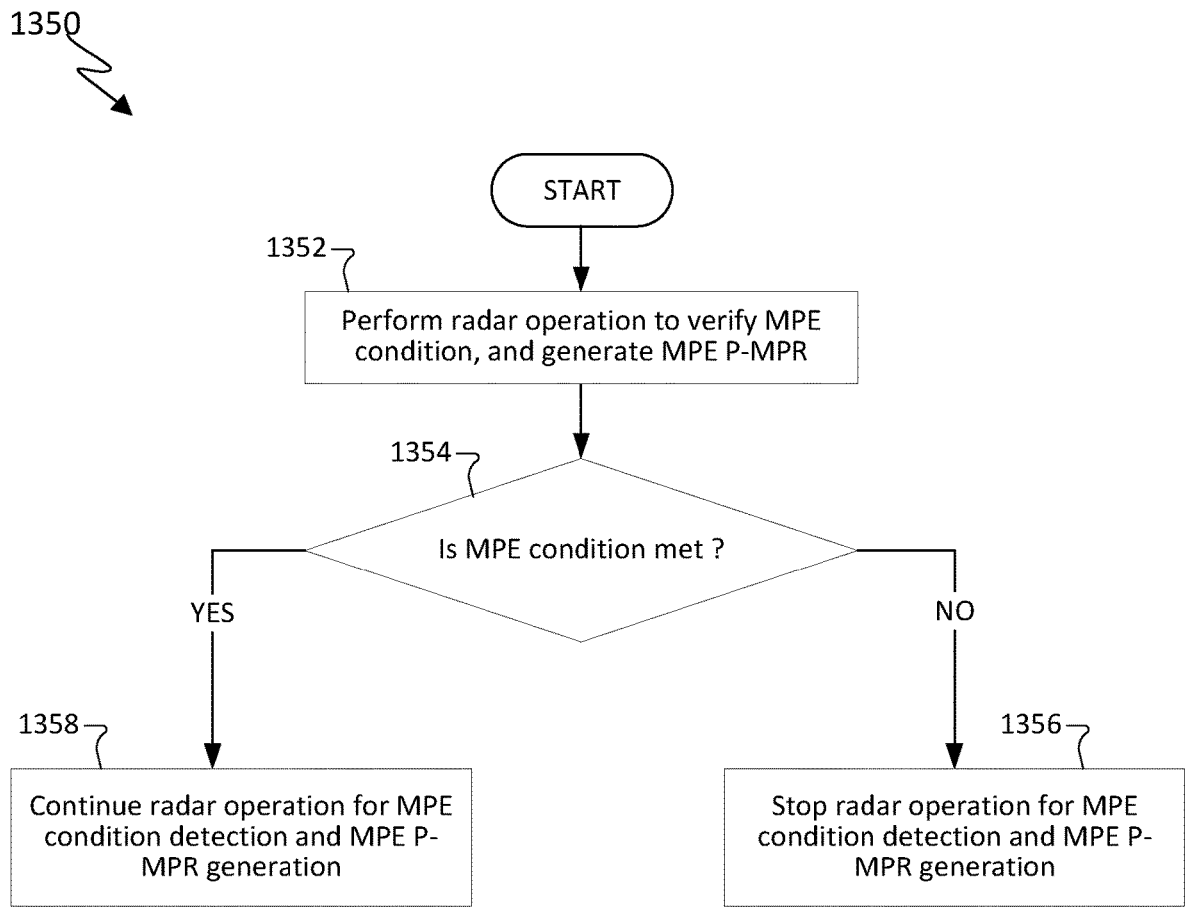
FIG. 13B illustrates a radar deactivation method in accordance with an embodiment of this disclosure.

FIGS. 13A and 13B illustrate methods of activating a radar for MPE compliance and deactivating the radar for preventing waste of energy resources. Specifically, FIG. 13A illustrates a radar activation method 1300, and FIG. 13B illustrates a radar deactivation method 1350. The embodiments of the methods 1300 and 1350 shown in FIGS. 13A and 13B are for illustration only, and other embodiments could be used without departing from the scope of this disclosure. For example, the method 1300 uses L1-RSRP as the measurement for triggering the radar to activate and perform object detection operations, however, the method 1300 could use other beam measurement metrics that are applicable, such as L1-SINR. The methods 1300 and 1350 can be implemented by a processor (for example, the processor 240 of FIG. 2) within one or more of the client devices 106-114 or by an electronic device 200, 300, 400, 700, 800 that includes a radar, such as the radar that includes the radar module 704 and the antenna panel 702a in FIG. 7, and that includes a WCM 706. For ease of explanation, the method 1300 of FIG. 13A could be and is described as being performed by the WCM 706 of the electronic device 700 in FIG. 7.

Referring to FIG. 13A, execution of the radar activation method 1300 includes identification of certain characteristics of the UE beam measurement result (e.g., L1-RSRP or L1-SINR), which can be indicative of an MPE condition in which the electronic device 200 needs to perform MPE mitigation for maintaining MPE compliance and the corresponding MPE P-MPR report generation. The radar activation method 1300 can reduce how frequent the radar is required to transmit and receive signals via the antenna array 205, leading to significant power consumption reduction.

At block 1302, the processor 240 obtains a set of signal quality measurements from a plurality of reference signals (SSBs) received at the electronic device 200. The signal quality measurements correspond to the reference signals, respectively. In certain embodiments, the processor 240 measures L1-RSRP 1202.

At block 1304, the processor 240 determines whether a change in amplitude in the set of signal quality measurements satisfies a temporal condition, and if satisfied, then the method 1300 proceeds to block 1306, but if not satisfied, then the method proceeds to block 1308. In certain embodiments, the processor 240 may determine whether the L1-RSRP level decreased significantly in a short duration. For example, the processor 240 determines whether the hand/body blockage condition is satisfied, particularly, determining whether a beam measurement metric change requirement is satisfied within a short duration. The temporal condition can be defined by the specified length of time 1204, which can be the short duration. The beam measurement metric change requirement can be requirement that an amplitude of the L1-RSRP or of the L1-SINR decreased significantly, such as by the threshold amplitude change $\Delta_1$. In the embodiment shown, the WCM 706 determines whether the amplitude change 1202c of the L1-RSRP measurement over a specified length of time 1204 (e.g., $t_0$ to $t_1$) indicates a possible occurrence of an object that moved into close proximity to the antenna module 702 or indicates presence of an object blocking signals transmitted and/or received between the UE and the base station, which is also shown in FIG. 12. The temporal condition is satisfied when the change in amplitude is greater than or equal to a threshold amplitude change $\Delta_1$ and occurs in less than or equal to the specified length of time 1204. For example, if the change of the L1-RSRP 1202 amplitude by the threshold amplitude change $\Delta_1$ takes less than or equal to the specified length of time 1204, then the temporal condition is satisfied. The temporal condition is not satisfied if the specified length of time 1204 elapses while the amplitude change 1202c is less than the threshold amplitude change $\Delta_1$.

At block 1306, the processor 240 does not trigger the radar operation. More particularly, the WCM 706 does not trigger the radar module 704 to switch to the ON state to perform object detection. The WCM 706 does not trigger the radar operation to assist with generation of the MPE P-MPR.

At block 1308, in response to a determination that the change in amplitude in the set of signal quality measurements satisfies the temporal condition, the processor 240 triggers the electronic device 200 to perform radar operations to determine whether a location of an object in proximity to the electronic device 200 satisfies a proximity condition. For example, the processor 240 activates the radar transceiver (e.g., within the transceiver(s) 210) to transmit radar signal(s), which are used by the radar to detect or confirm MPE mitigation should commence.

To enable the electronic device to detect MPE conditions when an L1-RSRP measurement result is not available, the processor 240 can trigger the radar module 704 to switch to the ON state beforehand or in parallel with the start of 5G mmW connectivity (i.e., concurrently with commencement of an initial access procedure according to a wireless communication protocol for connectivity to a wireless communication network), such as when the WCM 706 is turned ON and the initial access procedure is initiated. Depending on the connectivity phase of the electronic device (e.g., 5G RRC connection stage), and L1-RSRP measurement result may not available. For example, while the WCM 706 is executing an initial access phase from among the various 5G connectivity phases, the processor 240 may determine that an L1-RSRP measurement result is not available. Also, in some circumstances, the WCM 706 is not able to generate L1-RSRP measurement results. When L1-RSRP measurement results are unavailable or unable to be generated, the processor 240 is able to trigger the radar module 704 to perform radar operations for MPE compliance based on other beam measurement metrics that are available. In some embodiments, if the processor 240 determines (at block 1302) that the L1-RSRP measurement is unavailable or unable to be generated, then the method 1300 proceeds from block 1302 to block 1308 for the purpose of avoiding any misdetection that may occur at the decision block 1304. When L1-RSRP measurement result is unavailable, the WCM 706, without assistance from the object detection functions of the radar, may not be able to determine whether an MPE condition is satisfied. As a technical solution, at block 1308, in response to a determination that the WCM 706 is executing an initial access phase (for RRC connectivity) or that the L1-RSRP measurement result is unavailable, the processor 240 triggers the radar module 704 to activate.

To enable the electronic device to detect MPE conditions when an L1-RSRP measurement result is not available, the processor 240 can trigger the radar module 704 to switch to the ON state when the hand/body blockage condition is not satisfied. More particularly, the processor 240 can trigger the radar module 704 to switch to the ON state periodically (e.g., once every 10 seconds or every minute) or randomly, without meeting the L1-RSRP beam measurement metric change requirement. Periodically or randomly triggering the radar module 704 to activate and perform object detection to confirm satisfaction/unsatisfaction of an MPE condition is a technical advantage to maintain a low probability of misdetection (or failure to detect that the MPE condition is satisfied) while a beam measurement metric change requirement is not met.

At block 1310, which is similar to block 1002 of FIG. 10, the processor 240 determines whether the MPE condition is satisfied, and if not satisfied, the method 1300 proceeds to block 1312, but if satisfied, then the method 1300 proceeds to block 1314. More particularly, the WCM 706 determines that the MPE condition is satisfied based an outcome of the object detection operations performed by the radar module 704. In certain embodiments, the MPE condition, which can be a proximity condition, is satisfied when a distance of the object from the electronic device is within a threshold distance range. The threshold distance range can be defined by a specified distance from the electronic device (such as from the antenna panel 702). By performing radar operations, the radar module 704 measures the distance between the antenna panel 702 and the object. At block 1312, the processor 240 does not perform MPE mitigation and does not generate the MPE P-MPR. The method 1300 ends after block 1312.

At block 1314, the radar operation has been triggered and, a determination has been made that the MPE condition is satisfied by the radar detection result. More particularly, at block 1314, the processor 240, in response to a determination that the location of the object (e.g., distance between the antenna panel 702 and the object) satisfies the proximity condition, changes a transmission parameter of uplink wireless signals to satisfy a maximum permissible exposure of the object to radio frequency energy. That is, the WCM 706 performs MPE mitigation, and generates a MPE P-MPR corresponding to the MPE mitigation. To perform MPE mitigation, the WCM 706 performs UL power reduction, which may include changing a transmission parameter of uplink wireless signals to comply with the MPE regulation. The MPE P-MPR report corresponds to or reports the change of the transmission parameter of uplink wireless signals. Additional radar operation can be performed by the radar module 704 for the purpose of MPE P-MPR generation. The electronic device 200 sends the MPE P-MPR report to the network 102. The method 1300 ends after block 1314.

In certain embodiments, the processor 240 performs UE beam-level MPE mitigation, in which case, the set of signal quality measurements include signal quality measurements per beam of the electronic device. For example, WCM 706 measures the L1-RSRP per beam, and the radar module 704 can detect the MPE condition per beam or per angular zone. To perform beam-level MPE mitigation, the change of the transmission parameter of uplink wireless signals to satisfy the MPE includes reducing a transmission power of a beam that the electronic device uses to transmit the uplink wireless signals. The MPE mitigation procedure as well as the corresponding MPE P-MPR report generation are also performed corresponding to the UE beam. Particularly, the processor 240 is able to transmit a per-beam MPE P-MPR report. If the radar module 704 detects that a first beam satisfies a first MPE condition, a second beam satisfied a second MPE condition different from the first MPE condition, and a third beam does not satisfy any MPE condition, then the radar module 704 may reduce power of the first beam as a first beam-level MPE mitigation, may turn off (e.g., stop using) the second beam as a second beam-level MPE mitigation, and may allow the third beam to operate at full power without MPE mitigation. In a first example, the UE beam-level MPE mitigation and corresponding per-beam MPE P-MPR report generation are applied to the UE serving beam measurement. The UE serving beam can be defined as the beam used by the UE for control/data reception/transmission. In a second example, the UE serving beam for downlink are different from the UE serving beam for uplink, and in such case, the UE beam-level MPE mitigation and corresponding per-beam MPE P-MPR report generation is applied to the uplink serving beam as the relevant beam for MPE compliance. In a third example, the UE beam-level MPE mitigation and corresponding per-beam MPE P-MPR report generation is applied in parallel to a selected beam (e.g., the best beam) for each antenna panel 702a-702b, which enables the electronic device to keep track of the MPE condition for each antenna panel 702a-702b. In a fourth example, the UE makes an antenna panel switching decision based on the MPE condition and the required MPE mitigation to maintain a 5G connection with each antenna panel. For example, the set of signal quality measurements obtained at block 1302 can include signal quality measurements per antenna module 702 of the electronic device, wherein each beam is mapped to one of the antenna modules 702a or 702b.

Referring to FIG. 13B illustrates a radar deactivation method 1350. For ease of explanation, the method 1350 could be and is described as being performed by the radar module 704 of the electronic device 700 in FIG. 7.

In order to prevent energy waste, the radar module 704 switches to the OFF state in response to detecting the object (e.g., human) has sufficiently moved away from the electronic device 700 such that the object has exited the first area 120. The method 1350 starts after the radar operation has been triggered and/or the MPE condition has been detected, which means that the method 1350 starts as a result of the radar module switching to the ON state. At block 1352, the radar module 704 continues to perform radar operations to verify the MPE condition and generate a corresponding MPE P-MPR. That is, radar operations can continue to confirm the MPE condition is satisfied and update the MPE P-MPR report (for example, block 1110), until the MPE condition is no longer satisfied. So long as a distance between the antenna panel 702 and the object, as measured by the radar module 704, indicates that the object is located within the area of interest (e.g., first area 120), the radar module 704 will determine to remain in the ON state and to perform object detection including iteratively measuring the distance between the antenna panel 702 and the object.

At block 1354, which is similar to block 1310, the radar module 704 determines whether the MPE condition is met. For example, the MPE condition is not met if the location of the object does not satisfy the proximity condition (e.g., located external to the first area 120). In response to a determination that the MPE condition is not met, the radar operation can be stopped at block 1356.

In certain embodiments, other conditions are also possible to trigger stoppage of the radar operation, and in such other embodiments of block 1354, the processor 240 detects disconnection from the 5G mmWave network or detects the turning-off of the 5G module, and in response to detecting the disconnection or the turning-off, the method 1350 proceeds to block 1356. In certain embodiments, in response to a determination that the change (1202c) in amplitude in the set of signal quality measurements does not satisfy the temporal condition (e.g., specified period of time 1204), the radar module 704 can be maintained in a deactivated state at block 1356.

At block 1356, the radar module 704 stops performing radar operations (e.g., stops object detection), triggers the WCM 706 to stop performing MPE mitigation as well as the corresponding MPE P-MPR report generation. In certain embodiments, block 1356 further includes the WCM 706 stopping performance of MPE mitigation and stopping generating the corresponding MPE P-MPR report.

At block 1358, in response to determining that the MPE condition is met, the radar module 704 continues radar operations, performing object detection to determine whether the MPE condition is met. Further, based on the determination that the MPE condition is met, the WCM 706 continues to perform MPE mitigation and the corresponding MPE P-MPR report generation.

Figure 14:
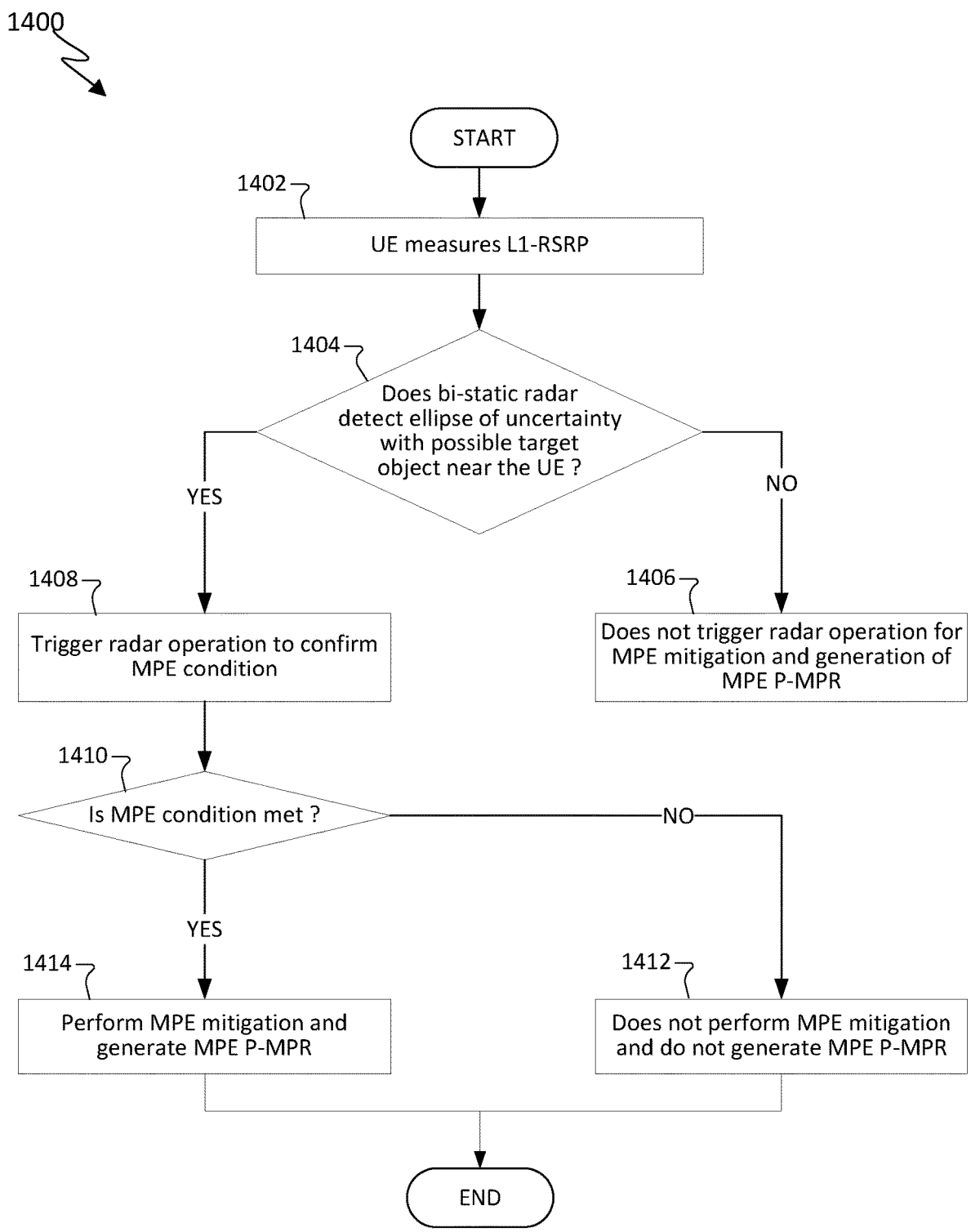
FIG. 14 illustrates a method for triggering monostatic radar measurement based on bistatic radar target detection in accordance with an embodiment of this disclosure.

FIG. 14 illustrates a method 1400 for triggering monostatic radar measurement based on bistatic radar target detection in accordance with an embodiment of this disclosure. The embodiment of the method 1400 shown in FIG. 14 is for illustration only, and other embodiments could be used without departing from the scope of this disclosure. The method 1400 can be implemented by a processor (for example, the processor 240 of FIG. 2) within one or more of the client devices 106-114 or by an electronic device 200, 300, 400, 700, 800 that includes a radar, particularly including a bistatic radar module and a monostatic radar. For example, a bistatic radar module can include software executed by the processor 240, that enables the electronic device 200 to perform the method 1400 and other biostatic radar operations. In certain embodiments of the electronic device 200, the memory 260 stores the bistatic radar module. In certain embodiments, the bistatic radar module includes the transceiver 210 through which wireless communication signals are received from the gNB 116.

At block 1402, which is similar to block 1302, the processor 240 receives wireless communication signals transmitted by the gNB 116 and measures the L1-RSRP 1202 over time. In addition to measuring the signal strength and/or quality of the received wireless communication signals, the method 1400 proceeds to block 1404, at which the processor 240 uses the bistatic radar module to further analyze content of the received wireless communication signals.

Figure 15:
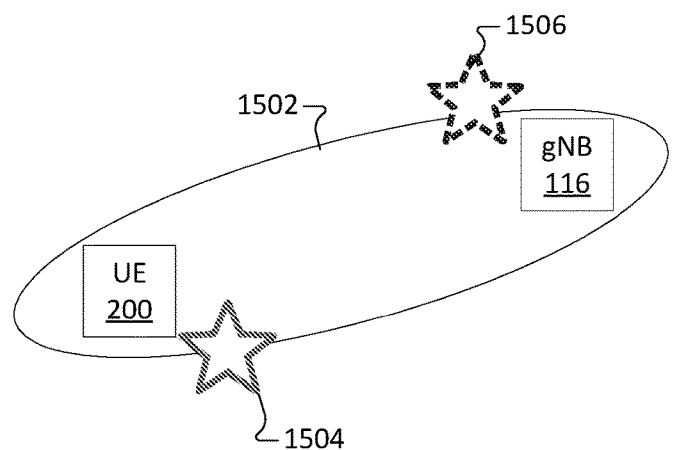
FIG. 15 illustrates an ellipse of uncertainty generated by a bistatic radar module of an electronic device in accordance with an embodiment of this disclosure.

Details of block 1404 and FIG. 15 will be described together for ease of explanation. FIG. 15 illustrates an ellipse of uncertainty 1502 that the bistatic radar module of the electronic device 200 generates by using wireless communication signal measurements (e.g., SSB measurements) that correspond to the wireless communication signals transmitted from the gNB 116. The ellipse of uncertainty 1502 encircles the position of the electronic device 200 and the position of the gNB 116. A target object, such as a human, may be located intermediately between the gNB 116 and the electronic device 200. Within the ellipse of uncertainty 1502, there can be at least two possible locations 1504 and 1506 of the target object, which are illustrated in the shape of a star. Depending on the position of the electronic device 200 and the position of the gNB 116, the possible locations 1504 and 1506 of the target object can be at different places within the ellipse of uncertainty 1502. As an example only, the first possible location 1504 of the target object is closer to the electronic device 200 than to the gNB 116, and the second possible location 1506 of the target object is closer to the gNB 116 than to the electronic device 200.

At block 1404, the processor 240 performs a bistatic estimate to determine a location of the target object to within an ellipse of uncertainty 1502 defined by a location of the electronic device 200 and by a location of the gNB 116. For example, the processor 240 determines whether the bistatic radar module of the electronic device 200 has detected, to within an ellipse of uncertainty 1502, a possible location 1504, 1506 of a target object in proximity to (for example, within the first area 120 of, or near) the position of electronic device 200. In response to determining that at least a portion of the ellipse of uncertainty 1502 is not in proximity to the location of the electronic device 200, or that the possible locations 1504 and 1506 are not within the ellipse of uncertainty 1502, the method 1400 proceeds to block 1406. In response determining that at least a portion of the ellipse of uncertainty 1502 is in proximity to the location of the electronic device, the method 1400 proceeds to block 1408. To make this determination at block 1404, the processor 240: ascertains the position of electronic device 200, for example, by using one or more sensors 265; ascertains a position of the gNB 116; and performs bistatic radar target detection by analyzing content of the received wireless communication signals, for example, by analyzing SSB measurements or other RS measurement. More particularly, the processor 240 (using the bistatic radar module) performs bistatic radar target detection by measuring the delay of the RS measurement to estimate the reflector/scatterer to within an ellipse of uncertainty 1502, which enables the bistatic radar module to estimate possible locations 1504 and 1506 of a detected target object to within the ellipse of uncertainty 1502. As reference signals are typically band limited, the range resolution of this ellipse of uncertainty 1502 could be limited similarly. Each of the possible locations 1504 and 1506 can be referred to as a measurement with respect to the ascertained position of the electronic device 200 and the ascertained position of the gNB 116, respectively.

The bistatic radar target detection performed by the electronic device 200 provides technical advantages compared to a typical UE. Because a typical UE uses one analog beam during the SSB measurements or during other RS signal measurements, angle estimation of the incoming RS signal (namely, the measured SSB) might not be available. In comparison to the typical UE, the bistatic radar target detection according to embodiments of this disclosure consumes fewer computing resources for computation at the electronic device 200 and is free from the time-frequency resource usage perspective, as the computations to estimate the possible locations 1504 and 1506 do not consume any time-frequency resource.

According to embodiments of this disclosure, bistatic refers to the base station as the radar transmitter, and the electronic device 200 as the radar receiver. By way of comparison, the electronic device 200 includes a monostatic radar in which the transmitter and receiver are both located within the electronic device 200. When the actual location of the target object is at the first possible location 1504, the bistatic radar module receives content of the wireless communication signals that is substantially identical to the content of the wireless communication signals that the bistatic radar module receives when the actual location of the target object is at the second possible location 1506. In other words, based on the results produced by analyses the electronic device 200 has performed over time, the electronic device 200 is configured to learn and know that when a target object is located between the electronic device 200 and the gNB 116 and at the first location 1504 close to the electronic device 200, then the content of the signals received from the gNB 116 match a first content, and that when a target object is located between the electronic device 200 and the gNB 116 and at the second location 1506 close to the gNB 116, the content of the signals received from the gNB 116 also match the first content. As a result, the bistatic radar module is not able to determine which point on the ellipse of uncertainty 1502 is the actual location of the target object based on the delay of the RS measurement without additional information. In response to receiving signals from the gNB 116, the bistatic radar module enables the electronic device 200 to execute a signal processing method that analyzes the content of the received signals to determine whether a target object is located between the electronic device 200 and the gNB 116 and generates the two possible locations 1504 and 1506 of the target object as an outcome of performance of the signal processing method.

Examples of additional information that can be used by the electronic device 200 to determine the actual location of the target object include additional measurements transmitted from another gNB, or additional angle information. Thus, this bistatic radar target detection can be used to trigger the electronic device 200 to activate the when to perform the monostatic radar measurements as described above. More particularly, the processor 240 triggers the transceiver(s) 210 to activate the monostatic radar determine whether the actual location of the target object is at a first location 1504 close to the electronic device 200 or at a second location 1506 that is closer to the base station 116 than to the electronic device 200. The goal is safety for the human, so the electronic device 200 is configured to trigger the monostatic radar operations to commence prior to determining whether the actual location of the target is near the electronic device 200, which allows the monostatic radar module 704 to confirm whether the MPE condition is satisfied.

At blocks 1406, 1408, 1410, 1412, and 1414, the processor 240 performs a function that is similar to the function performed in blocks 1306, 1308, 1310, 1312, and 1314, respectively. At block 1408, the radar module 704 activates and is triggered to perform radar operations to determine whether the location of the target object in proximity to an antenna panel 702 of the electronic device satisfies the MPE condition (e.g., proximity condition). If the distance between location of the target object and the electronic device 200, as determined at block 1408 by monostatic radar module 704, is within a range that satisfies the MPE proximity condition at block 1410, then at block 1414, in response to determining that the MPE proximity condition is met, the radar module 704 triggers the WCM 706 to perform MPE mitigation and generate the corresponding MPE P-MPR.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    obtaining a set of signal quality measurements, the signal quality measurements corresponding to reference signals, respectively, from among a plurality of reference signals received at an electronic device;
    determining whether a change in amplitude in the set of signal quality measurements satisfies a temporal condition that defines a specified length of time and a threshold amplitude change within the specified length of time;
    in response to a determination that the change in amplitude in the set of signal quality measurements satisfies the temporal condition, triggering the electronic device to perform radar operations to determine whether a location of an object in proximity to the electronic device satisfies a proximity condition;
    in response to a determination that the change in amplitude in the set of signal quality measurements does not satisfy the temporal condition, not triggering the electronic device to perform radar operations; and
    in response to a determination that the location of the object satisfies the proximity condition, changing a transmission parameter of uplink wireless signals to satisfy a maximum permissible exposure (MPE) of the object to radio frequency energy.

2. The method of claim 1, wherein the temporal condition is satisfied when the change in amplitude is greater than or equal to the threshold amplitude change and occurs in less than or equal to the specified length of time, and
    wherein the proximity condition is satisfied when a distance of the object from the electronic device is within a threshold distance range.

3. The method of claim 1, further comprising:
    after the radar operation has been triggered:
        deactivating a radar module of the electronic device in response to the determination that the change in amplitude in the set of signal quality measurements does not satisfy the temporal condition; and
        deactivating a radar module of the electronic device in response to a determination that the location of the object does not satisfy the proximity condition.

4. The method of claim 3, further comprising at least one of:
    activating the radar module of the electronic device periodically, including while the change in amplitude in the set of signal quality measurements does not satisfy the temporal condition; and
    activating the radar module of the electronic device prior to or concurrently with commencement of an initial access procedure according to a wireless communication protocol for connectivity to a wireless communication network.

5. The method of claim 1, further comprising:
    generating an MPE power management maximum power reduction (P-MPR) report corresponding to the change of the transmission parameter of uplink wireless signals to satisfy the MPE.

6. The method of claim 1, wherein:
    the set of signal quality measurements comprise signal quality measurements per antenna module of the electronic device or signal quality measurements per beam of the electronic device; and
    changing the transmission parameter of uplink wireless signals to satisfy the MPE comprises reducing a transmission power of a beam that the electronic device uses to transmit the uplink wireless signals.

7. The method of claim 6, wherein the change in amplitude in the set of signal quality measurements includes at least one of:
    a change in amplitude of an L1-RSRP measurement per beam of the electronic device; and
    a change in amplitude of an L1-SINR measurement per beam of the electronic device.

8. The method of claim 1, further comprising:
    performing bistatic radar operations with a base station to determine a location of the object to within an ellipse of uncertainty defined by a location of the electronic device and a location of the base station; and
    in response determining that at least a portion of the ellipse of uncertainty is in proximity to the electronic device, triggering the electronic device to perform the radar operations to determine whether the location of the object in proximity to the electronic device satisfies the proximity condition, wherein the radar operations comprise monostatic radar operations.

9. An electronic device comprising:
a radar circuit configured for the electronic device to operate using radar operations;
a wireless communication circuit configured for the electronic device to operate using a wireless communication protocol different from the radar operations; and
a processor configured to:
  obtain a set of signal quality measurements, the signal quality measurements corresponding to reference signals, respectively, from among a plurality of reference signals received at an electronic device;
  determine whether a change in amplitude in the set of signal quality measurements satisfies a temporal condition that defines a specified length of time and a threshold amplitude change within the specified length of time;
  in response to a determination that the change in amplitude in the set of signal quality measurements satisfies the temporal condition, trigger the electronic device to perform radar operations to determine whether a location of an object in proximity to the electronic device satisfies a proximity condition;
  in response to a determination that the change in amplitude in the set of signal quality measurements does not satisfy the temporal condition, do not trigger the electronic device to perform radar operations; and
  in response to a determination that the location of the object satisfies the proximity condition, change a transmission parameter of uplink wireless signals to satisfy a maximum permissible exposure (MPE) of the object to radio frequency energy.

10. The electronic device of claim 9, wherein the temporal condition is satisfied when the change in amplitude is greater than or equal to the threshold amplitude change and occurs in less than or equal to the specified length of time, and
wherein the proximity condition is satisfied when a distance of the object from the electronic device is within a threshold distance range.

11. The electronic device of claim 9, wherein the processor is further configured to deactivate a radar module of the electronic device in response to at least one of:
  the determination that the change in amplitude in the set of signal quality measurements does not satisfy the temporal condition; or
  a determination that the location of the object does not satisfy the proximity condition.

12. The electronic device of claim 11, wherein the processor is further configured to at least one of:
  activate the radar module of the electronic device periodically, including while the change in amplitude in the set of signal quality measurements does not satisfy the temporal condition; or
  activate the radar module of the electronic device prior to or concurrently with commencement of an initial access procedure according to a wireless communication protocol for connectivity to a wireless communication network.

13. The electronic device of claim 9, wherein the processor is further configured to:
  generate an MPE power management maximum power reduction (P-MPR) report corresponding to the change of the transmission parameter of uplink wireless signals to satisfy the MPE.

14. The electronic device of claim 9, wherein:
  the set of signal quality measurements comprise signal quality measurements per antenna module of the electronic device or signal quality measurements per a beam of the electronic device; and
  the processor is further configured to change the transmission parameter of uplink wireless signals to satisfy the MPE by reducing a transmission power of a beam that the electronic device uses to transmit the uplink wireless signals.

15. The electronic device of claim 14, wherein the change in amplitude in the set of signal quality measurements includes at least one of:
  a change in amplitude of an L1-RSRP measurement per beam of the electronic device; and
  a change in amplitude of an L1-SINR measurement per beam of the electronic device.

16. The electronic device of claim 9, the processor is further configured to:
  perform bistatic radar operations with a base station to determine a location of the object to within an ellipse of uncertainty defined by a location of the electronic device and a location of the base station; and
  in response determining that at least a portion of the ellipse of uncertainty is in proximity to the electronic device, trigger the electronic device to perform the radar operations to determine whether the location of the object in proximity to the electronic device satisfies the proximity condition, wherein the radar operations comprise monostatic radar operations.

17. A non-transitory computer readable medium embodying a computer program, the computer program comprising computer readable program code that when executed causes at least one processor to:
  obtain a set of signal quality measurements, the signal quality measurements corresponding to reference signals, respectively, from among a plurality of reference signals received at an electronic device;
  determine whether a change in amplitude in the set of signal quality measurements satisfies a temporal condition that defines a specified length of time and a threshold amplitude change within the specified length of time;
  in response to a determination that the change in amplitude in the set of signal quality measurements satisfies the temporal condition, trigger the electronic device to perform radar operations to determine whether a location of an object in proximity to the electronic device satisfies a proximity condition;
  in response to a determination that the change in amplitude in the set of signal quality measurements does not satisfy the temporal condition, do not trigger the electronic device to perform radar operations; and
  in response to a determination that the location of the object satisfies the proximity condition, change a transmission parameter of uplink wireless signals to satisfy a maximum permissible exposure (MPE) of the object to radio frequency energy.

18. The non-transitory computer readable medium of claim 17, wherein the temporal condition is satisfied when the change in amplitude is greater than or equal to the threshold amplitude change and occurs in less than or equal to the specified length of time, and
wherein the proximity condition is satisfied when a distance of the object from the electronic device is within a threshold distance range.

19. The non-transitory computer readable medium of claim 17, further comprising instructions that when executed cause the at least one processor to deactivate a radar module of the electronic device in response to at least one of:

the determination that the change in amplitude in the set of signal quality measurements does not satisfy the temporal condition; or a determination that the location of the object does not satisfy the proximity condition.

20. The non-transitory computer readable medium of claim 19, further comprising instructions that when executed cause the at least one processor to at least one of:

activate the radar module of the electronic device periodically, including while the change in amplitude in the set of signal quality measurements does not satisfy the temporal condition; or activate the radar module of the electronic device prior to or concurrently with commencement of an initial access procedure according to a wireless communication protocol for connectivity to a wireless communication network.

\* \* \* \* \*